United States Patent [19]
Yu

[11] Patent Number: 5,698,358
[45] Date of Patent: Dec. 16, 1997

[54] PROCESS FOR FABRICATING A BELT WITH A SEAM HAVING A CURVILINEAR S SHAPED PROFILE

[75] Inventor: Robert C. U. Yu, Webster, N.Y.

[73] Assignee: Xerox Corporation, Stamford, Conn.

[21] Appl. No.: 710,050

[22] Filed: Sep. 10, 1996

Related U.S. Application Data

[63] Continuation of Ser. No. 982,530, Nov. 27, 1992, abandoned.

[51] Int. Cl.$^6$ ............................................. G03G 5/00
[52] U.S. Cl. .......................... 430/127; 428/58; 428/60; 428/126; 428/192; 156/304.5; 156/304.1; 156/157
[58] Field of Search .................... 430/127; 428/57, 428/58, 60, 192, 126; 156/304.1, 304.3, 304.5, 157, 159, 73.1

[56] References Cited

U.S. PATENT DOCUMENTS

| | | | |
|---|---|---|---|
| 3,493,448 | 2/1970 | Powell et al. | 156/73 |
| 4,410,575 | 10/1983 | Obayashi et al. | 428/57 |
| 4,430,146 | 2/1984 | Johnson | 156/502 |
| 4,435,457 | 3/1984 | Servo et al. | 428/58 |
| 4,521,457 | 6/1985 | Russell et al. | 427/286 |
| 4,532,166 | 7/1985 | Thomsen et al. | 428/57 |
| 4,648,893 | 3/1987 | Roux | 65/26 |
| 4,648,931 | 3/1987 | Johnston | 156/251 |
| 4,758,486 | 7/1988 | Yamazaki et al. | 430/56 |
| 4,776,904 | 10/1988 | Charlton et al. | 156/73.1 |
| 4,838,964 | 6/1989 | Thomsen et al. | 156/73.1 |
| 4,878,985 | 11/1989 | Thomsen et al. | 156/459 |
| 4,883,742 | 11/1989 | Wallbillich et al. | 430/275 |
| 4,937,117 | 6/1990 | Yu | 428/57 |
| 4,943,508 | 7/1990 | Yu | 430/129 |
| 4,959,109 | 9/1990 | Swain et al. | 156/73.4 |
| 4,968,369 | 11/1990 | Darcy et al. | 156/217 |
| 5,021,109 | 6/1991 | Petropoulos et al. | 156/137 |
| 5,039,598 | 8/1991 | Abramsohn et al. | 430/53 |
| 5,151,149 | 9/1992 | Swartz | 156/379.8 |
| 5,208,087 | 5/1993 | Stigberg | 428/60 |
| 5,273,799 | 12/1993 | Yu et al. | 428/57 |
| 5,286,586 | 2/1994 | Foley et al. | 156/73.1 |
| 5,298,956 | 3/1994 | Mammino et al. | 355/275 |

FOREIGN PATENT DOCUMENTS

| | | | |
|---|---|---|---|
| 56-154050 | 11/1981 | Japan | 156/257 |
| 58-74315 | 5/1983 | Japan | 156/73.1 |
| 62-44429 | 2/1987 | Japan | 156/272.8 |
| 3194131 | 2/1993 | Japan . | |

*Primary Examiner*—George F. Lesmes
*Assistant Examiner*—Laura Weiner

[57] ABSTRACT

A process including providing a flexible substantially rectangular sheet having a first major exterior surface opposite and parallel to a second major exterior surface, removing or displacing material from the first major exterior surface adjacent and parallel to a first edge of the sheet to form a new first surface having an elongated, curvilinear "S" shaped profile when viewed in a direction parallel to the first edge, overlapping the new first surface and a second surface adjacent a second edge of the sheet whereby the first new surface contacts the second surface to form a mated surface region, the second surface being adjacent to or part of the second major exterior surface to form the sheet into a loop, the second edge being at an end of the sheet opposite from the first edge, and permanently joining the new first surface to the second surface into a seam to form a seamed belt of this invention. The resulting welded belt has a seam thickness of less than about 120 percent of the total thickness of the belt.

13 Claims, 5 Drawing Sheets

PROCESS FOR FABRICATING A BELT WITH A SEAM HAVING A CURVILINEAR S SHAPED PROFILE

This is a continuation, of application Ser. No. 07/982,530, filed Nov. 27, 1992, now abandoned.

BACKGROUND OF THE INVENTION

This invention relates in general to flexible belts, and more specifically, to flexible belts having morphologically improved seams and methods for fabricating the flexible belts.

Coated flexible belts or tubes are commonly utilized for numerous purposes such as electrostatographic imaging members, conveyor belts, drive belts, intermediate image transfer belts, sheet transport belts, document handling belts, donor belts for transporting toner particles, and the like.

Flexible belts, such as electrostatographic imaging members, are well known in the art. Typical electrostatographic flexible imaging members include, for example, photoreceptors for electrophotographic imaging systems, and electroreceptors or ionographic imaging members for electrographic imaging systems. Both electrophotographic and electrographic imaging members are commonly utilized in a belt configuration. Electrostatographic imaging member belts commonly employed in the imaging machines have a welded seam. For electrophotographic applications, the imaging members preferably comprise a flexible substrate coated with one or more layers of photoconductive material. The substrates are usually organic materials such as a film forming polymer. The photoconductive coatings applied to these substrates may comprise inorganic materials such as selenium or selenium alloys, organic materials, or combinations of organic and inorganic materials. The organic photoconductive layers may comprise, for example, a single binder layer or multilayers comprising, for example, a charge generating layer and a charge transport layer. The charge generating layer is capable of photogenerating holes and injecting the photogenerated holes into the charge transport layer. The basic process for using electrostatographic flexible imaging members is well known in the art.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One typical type of multilayered imaging member that has been employed as a belt in electrophotographic imaging systems comprises a substrate, a conductive layer, a hole blocking layer, an adhesive layer, a charge generating layer, a charge transport layer, and a conductive ground strip layer adjacent to one edge of the imaging layers. This imaging member may also comprise additional layers, such as an anti-curl back coating layer to render the desirable imaging member flat and an optional overcoating layer to protect the exposed charge transport layer from wear.

The electrophotographic imaging flexible member is usually fabricated from a sheet cut from a web. The sheets are generally rectangular in shape. All sides may be of the same length, or one pair of parallel sides may be longer than the other pair of parallel sides. The sheets are fabricated into a belt by overlap joining the opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing and the like. Ultrasonic welding is generally the preferred method of joining for flexible polymeric sheets because of its speed, cleanliness (no solvents) and production of a thin and narrow seam. In addition, ultrasonic welding is preferred because it causes the generation of heat at the contiguous overlapping marginal end regions of the sheet to maximize melting of one or more coating layers therein and facilitate direct contact of the supporting substrate for fusing at the overlapping end regions.

The flexible imaging member used in an electrophotographic imaging machine can be a photoreceptor belt fabricated by the ultrasonic welding of the overlapped opposite ends of a rectangular sheet. The expression "rectangular", as employed herein, is intended to include four sided sheets where all sides are of equal length or sheets where the length of two parallel sides is unequal to the other two parallel sides. In the ultrasonic seam welding process, ultrasonic energy transmitted to the overlap region is used to melt the coating layers of the photoconductive sheet thereby providing direct substrate fusing into a seam. The ultrasonic welded seams of multilayered photoreceptor belts are relatively brittle and low in elasticity and toughness. This joining technique of the ultrasonic welding process, can result in the formation of flashing and splashing that project, respectively, beyond the edges of the belt and either side of the overlap region of the seam. The seam flashing can be removed from either edge of the belt with the use of a reciprocating punch or notching device. The reciprocating punch has small circular section and removes the flashing and part of the seam to form a generally semi-circular notch in either edge of the belt. However, with the overlap and presence of seam splashing, the flexible imaging member is about 1.6 times thicker in the seam region than that of the remainder thereof (in a typical example, 188 micrometers versus 116 micrometers). Instead of overlapping the ends, one may weld ends that are abutted end to end. These ends may be cut at an angle perpendicular to or at a slight bias angle relative to the major surfaces of the belt. Both of these butt joined embodiments give weaker joints. Moreover, the ends of the embodiment in which the ends are cut at an angle at a slight angle relative to a major surface of the belt, tends to slide against each other during the welding operation to cause the final welded belt to have a larger circumference than when the the butt ends were in full contact with each other immediately prior to initiation of the welding step.

The photoreceptor belt undergoes strain as it is cycled over a plurality of belt support rollers in an electrophotographic imaging apparatus. The excessive thickness of the photoreceptor belt in the seam region due to the presence of the splashing and seam overlap results in a large induced bending strain as the seam passes over each support roller. Generally, small diameter support rollers, highly desirable for simple, reliable copy paper self-stripping systems, are used in compact electrophotographic imaging apparatus which require a photoreceptor belt to operate in a very confined space. Unfortunately, small diameter rollers, e.g., less than about 0.75 inches (19 millimeters) in diameter, raise the threshold of mechanical performance criteria for photoreceptor belts to such a high level that premature photoreceptor belt seam failure can frequently occur thereby shortening the service life of the belt. For example, when bent over a 19 millimeter roller, a conventional commercially available XEROX® welded photoreceptor belt seam may develop a 0.96 percent induced bending strain. Compared to a 0.59 percent tensile bending strain for the rest of the belt, the 0.96 percent tensile strain in the seam region of the belt represents a 63 percent increase in stress placed upon the overlapped seam and splashing which leads to the development of seam cracking, delamination, and tearing during extended cycling.

Under dynamic fatiguing conditions, the seam overlap and splashing provide a focal point for stress concentration and become the initial point of failure that affects the mechanical integrity of the belt. The excessive thickness of the seam overlap and splashing, thus tend to shorten the mechanical life of the seam and, hence, adversely affects the service life of the flexible member belt in copiers, duplicators, and printers. Moreover, the excessive seam thickness and irregular splash protrusions cause the development of large lateral friction forces against cleaning blades during electrophotographic imaging and cleaning processes. This mechanical interaction has been observed to severely affect the life of the imaging belt, exacerbate blade wear, and induce belt velocity variations during belt cycling.

INFORMATION DISCLOSURE STATEMENT

The following disclosures may be relevant to various aspects of the present invention and are briefly summarized as follows:

U.S. Pat. No. 4,758,486 describes the fabrication of an endless belt shaped electrophotographic photoconductor. The belt comprises an electroconductive support material, a photoconductive layer formed thereon, a joint portion by which the electrophotographic photoconductor is worked into the shape of an endless belt. The joint portion is covered with an electroconductive overcoating layer comprising a polymeric material having a glass transition temperature of $-10°$ C. or lower and finely divided electroconductive particles, or the joint portion further comprising a joint reinforcement resin layer which is formed so as to be inserted between the electroconductive overcoating layer and the photoconductive layer in the joint portion.

U.S. Pat. No. 4,521,457 and U.S. Pat. No. 4,943,508 each disclose a process and apparatus for applying to a surface of a support member, at least one ribbon-like stream of a first coating composition adjacent to and in edge contact with at least one second ribbon-like stream of a second coating composition to form a unitary layer on the surface of the support member. The introduction of coating into a reservoir chamber forms a generally wedge shaped spacing member.

U.S. Pat. No. 4,883,742 discloses a joining of an end and/or lateral areas of thermoplastically processable photosensitive layers. The end and/or lateral areas of photosensitive layers are overlapped to avoid bubbles and air cavities between the end and/or lateral areas. The overlapped area is then heated under pressure to firmly join the areas together. The joined photosensitive layer is then treated and smoothed to shape it to size.

U.S. Pat. No. 4,410,575 discloses a method of lap welding fabrics together by superposing two end portions of one or two fabrics on each other with an interposing bonding tape between the superposed two end portions. The method includes applying a high frequency wave treatment and/or heat treatment by pressing at least one of the superposed end portions to melt the interposed portion of the bonding tape in order to lap melt the fabrics to each other. At least one side edge portion of the tape extends outwardly over an edge of the end portion which is deformed from the forces absorbed when the heat treatment and frequency wave treatment are applied. The fabrics may be made of any fibers or natural fibers.

U.S. Pat. No. 3,493,448 discloses a method of splicing photographic film by an ultrasonic welding apparatus which includes steps comprising sand blasting the ends to be welded and chilling the fused ends to be fused together. The ends of the photographic film are overlapped and compressed together. Heat is introduced into the film ends for fusing together.

U.S. Pat. No. 4,968,369 discloses an apparatus and process for fabricating belts wherein the leading edge and the trailing edge are overlapped to form a lap joint. Welding of the belt results in flashings at each end of the welded lap joint. A punch cutter is utilized to remove weld flashings at each end of the welded belt lap joint.

U.S. Pat. No. 4,878,985 and U.S. Pat. No. 4,838,964 each disclose an apparatus and a process for fabricating belts wherein the leading edge and the trailing edge are overlapped to form a loop of a web segment loosely suspended from the overlapped joint. The web is sheared to form a leading edge free of defects. An ultrasonic belt welding station comprising an ultrasonic horn and transducer assembly is utilized in the fabrication of the belt.

U.S. Pat. No. 4,937,117 discloses a flexible belt fabricated from a substantially rectangular sheet having a first edge joined to a second parallel edge to form a seam. Flashings at the ends of the welded seam of the belt are removed by means of a notching device capable of cutting the desired elongated shape.

U.S. Pat. No. 4,959,109 discloses a process and apparatus for fabricating a unitary belt comprising two rotatable mandrels and a wrapping station. A web is wrapped around each rotatable mandrel whereat the web is severed to form a trailing edge. A wrapping station overlaps a leading edge of the web to form a belt having a seam.

U.S. Pat. No. 4,532,166 discloses a welded web and a process for forming the web. The web may be formed by a process in which a web having a first edge is provided. At least one aperture is formed in at least the first edge. The first edge is then overlapped on an exposed surface of a second edge. Ultrasonic welding may be used to raise the temperature of at least the region of contiguous contact adjacent the aperture. Thermoplastic material from the second edge at least partially fills the aperture thereby bonding the first edge to the second edge.

U.S. Pat. No. 4,648,931 discloses a method of forming a bead seal in a biaxially oriented polymer film by heat bonding. The method consists of pressing together web layers in a sealing zone, a selected segment of the pressed web being heated above the bonding temperature of the plastic while adjacent web segments are maintained below that temperature. The heated web segment has a relatively lower surface friction than the surfaces pressing the adjacent web segment. The layers of the heated segment of the web are physically unrestrained against shrinking during heating and are allowed to shrink back to their pre-oriented molecular configuration while the adjacent segment is restrained against movement. A hermetic bead seal is thus formed between the web layers.

U.S. Pat. No. 4,430,146 discloses a belt splicing method and apparatus. The apparatus comprises pairs of longitudinal bars on which are respectively mounted platen heating assemblies. One bar is centrally supported pivotally on a clamping arrangement and the other bar is removably connected with the clamping arrangement in a manner permitting pivotable disposition of the bars with their platens in opposed facing parallel relation at various spacings. The apparatus facilitates a new belt splicing method eliminating the conventional need to use supplementary liquid thermoplastic material to effect bonding of the belt ends. By this process, a new belt splice is provided with the spliced ends being fused together with their respective thermoplastic material.

U.S. Pat. No. 5,021,109 discloses a process for preparing a multilayered sheet to form a flexible belt. A tubular sleeve of polymeric material is heated to at least apparent glass transition temperature. The tubular sleeve is placed about a mandrel and treated with one or more layers. The sleeve is reheated, then removed from the mandrel. A seamless belt, having a predetermined inner circumference, is formed.

Thus, there is a continuing need for extending the functional life of flexible belt electrostatographic imaging member belts to achieve improved resistance to tearing, delamination, and cracking at the seam, as well as to suppress mechanical interactions between the seam and cleaning blade or other contacting subsystems.

SUMMARY OF THE INVENTION

It is, therefore, an object of the present invention to provide an improved flexible belt which overcomes the above-noted disadvantages.

It is yet another object of the present invention to provide an improved flexible belt, particularly an electrostatographic member, having a seam that exhibits greater resistance to tearing.

It is still another object of the present invention to provide an improved flexible belt, particularly an electrostatographic member, with a seam exhibiting greater resistance to dynamic fatigue delamination.

It is another object of the present invention to provide an improved flexible belt, particularly an electrostatographic member, which has improved resistance to fatigue bending induced cracking.

It is yet another object of the present invention to provide an improved flexible electrostatographic imaging member belt which exhibits improved life during belt cycling.

It is still another object of the present invention to provide an improved process for fabricating flexible belts.

It is another object of the present invention to provide an improved flexible belt that reduces or eliminates belt velocity variations during belt cycling.

It is another object of the present invention to provide an improved flexible belt, particularly an electrophotographic imaging member, having reduced seam thickness and less splashings that minimize cleaning blade and other contacting subsystems that interact with the belt seam.

The foregoing objects and others are accomplished in accordance with this invention by providing a process comprising providing a flexible substantially rectangular sheet having a first major exterior surface opposite and parallel to a second major exterior surface, removing or displacing material from the first major exterior surface adjacent and parallel to a first edge of the sheet to form a new first surface having an elongated, curvilinear "S" shaped profile when viewed in a direction parallel to the first edge, overlapping the new first surface and a second surface adjacent a second edge of the sheet whereby the first new surface contacts the second surface to form a mated surface region, the second surface being adjacent to or part of the second major exterior surface to form the sheet into a loop, the second edge being at an end of the sheet opposite from the first edge, and permanently joining the new first surface to the second surface into a seam to form a seamed belt of this invention. The resulting welded belt has a seam thickness of less than about 120 percent of the total thickness of the belt.

Electrostatographic flexible belt imaging members are well known in the art. Typical electrostatographic flexible belt imaging members include, for example, photoreceptors for electrophotographic imaging systems and electroreceptors or ionographic members for electrographic imaging systems.

Electrostatographic flexible belt imaging member may be prepared by various techniques. A typical flexible supporting substrate is provided with an electrically conductive surface. For electrophotographic imaging members, at least one photoconductive layer is then applied to the electrically conductive surface. A hole blocking layer may be applied to the electrically conductive layer prior to the application of the photoconductive layer. If desired, an adhesive layer may be utilized between the hole blocking layer and the photoconductive layer. For multilayered photoreceptors, a charge generation layer is usually applied onto the hole blocking layer and a charge transport layer is subsequently coated over the charge generation layer. For ionographic imaging members, an electrically insulating dielectric layer is applied directly onto the electrically conductive surface.

The supporting substrate may be opaque or substantially transparent and may comprise numerous materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible in thin webs. The electrically insulating or conductive substrate should be flexible and in the form of an endless flexible belt. Preferably, the endless flexible belt shaped substrate comprises a commercially available biaxially oriented polyester.

The thickness of the supporting substrate layer depends on numerous factors, including beam strength, mechanical toughness, and economical considerations. Thus, the substrate layer used for a flexible belt application may be of substantial thickness, for example, about 125 micrometers, or of a minimum thickness of not less than about 50 micrometers, provided that it produces no adverse effects on the belt. For practical purposes, the thickness of the substrate layer may range from about 65 micrometers to about 150 micrometers, and preferably from about 75 micrometers to about 100 micrometers for optimum flexibility, beam rigidity, and minimum stretch when cycled.

The conductive layer may vary in thickness over substantially wide ranges depending on the optical transparency and degree of flexibility desired for the electrostatographic member. Accordingly, for a flexible electrophotographic imaging device, the thickness of the conductive layer may be between about 20 angstroms to about 750 angstroms, and more preferably from about 100 angstroms to about 200 angstroms for an optimum combination of electrical conductivity, flexibility and light transmission. The flexible conductive layer may be an electrically conductive metal layer formed, for example, on the substrate by any suitable coating technique, such as a vacuum depositing technique.

Typical metals include aluminum, copper, gold, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. A typical electrical conductivity for conductive layers for electrophotographic imaging members in slow speed copiers is about 10-2 to 10-3 ohms/square.

After formation of an electrically conductive surface, a hole blocking layer may be applied thereto for photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The hole blocking layer may be nitrogen containing siloxanes or nitrogen containing titanium compounds such as trimethoxysilyl propylene diamine, hydrolyzed timethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylaminoethylamino)titanate, ispropyl trianthranil titanate, isopropyl tri(N,N-dimethyl-ethylamino) titanate, titanium-4-amino benzene sulfonat oxyacetate, titanium 4-aminobenzoate isostearate oxyacetate, [$H_2N(H_2)4$] $CH_3Si(OCH_3)_2$, (gamma-aminobutyl) methyl diethoxysilane, and [$H_2N(CH_2)_3$]$CH_3Si(OCH_3)_2$ (gamma-aminopropyl) methyl diethoxysilane. A preferred hole blocking layer comprises a reaction product between a hydrolyzed silane and the oxidized surface of a metal ground plane layer. The hole blocking layer may be applied by any suitable conventional technique such as spraying, dip coating, draw bar coating, gravure coating, silk screening, air knife coating, reverse roll coating, vacuum deposition, chemical treatment and the like. The hole blocking layer should be continuous and have a dry thickness of less than about 0.2 micrometer.

An adhesive layer is usually applied to the hole blocking layer. Any suitable adhesive layer well known in the art may be utilized. Typical adhesive layer materials include, for example, polyesters, polyurethanes, and the like. Satisfactory results may be achieved with the adhesive layer thickness between about 0.05 micrometer and about 0.3 micrometer. Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable charge generating (photogenerating) layer may be applied onto the adhesive layer. Charge generating layers are well know in the art and can comprise homogeneous layers or photoconductive particles dispersed in a film forming binder. Examples of charge generating layers are described, for example, in U.S. Pat. No. 3,357,989, U.S. Pat. No. 3,442,781, and U.S. Pat. No. 4,415,639, the disclosures thereof being incorporated herein in their entirety. Other suitable photogenerating materials known in the art may also be utilized, if desired.

Any suitable polymeric film forming binder material may be employed as the matrix in of the photogenerating layer. Typical polymeric film forming materials include those described, for example, in U.S. Pat. No. 3,121,006, the disclosure thereof being incorporated herein in its entirety. The photogenerating composition or pigment may be present in the film forming binder composition in various amounts. Generally, from about 5 percent by volume to about 90 percent by volume of the photogenerating pigment is dispersed in about 10 percent by volume to about 90 percent by volume of the resinous binder. Preferably from about 20 percent by volume to about 30 percent by volume of the photogenerating pigment is dispersed in about 70 percent by volume to about 80 percent by volume of the resinous binder composition.

The photogenerating layer generally ranges in thickness from about 0.1 micrometer to about 5 micrometers, preferably from about 0.3 micrometer to about 3 micrometers. The photogenerating layer thickness is related to binder content. Higher binder content compositions generally require thicker layers for photogeneration.

Any suitable and conventional technique may be utilized to mix and thereafter apply the photogenerating layer coating mixture to the previously dried adhesive layer. Drying of the deposited coating may be effected by any suitable conventional technique.

The charge transport layer may comprise any suitable transparent organic polymer or non-polymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack. The charge transport layer should exhibit negligible, if any, discharge when exposed to a wavelength of light useful in xerography, e.g. 4000 Angstroms to 9000 Angstroms. The charge transport layer is normally transparent in a wavelength region in which the electrophotographic imaging member is to be used when exposure is effected therethrough to ensure that most of the incident radiation is utilized by the underlying charge generating layer. When used with a transparent substrate, imagewise exposure or erase may be accomplished through the substrate with all light passing through the substrate. In this case, the charge transport material need not transmit light in the wavelength region of use if the charge generating layer is sandwiched between the substrate and the charge transport layer. The charge transport layer in conjunction with the charge generating layer is an insulator to the extent that an electrostatic charge placed on the charge transport layer is not conducted in the absence of illumination. Charge transport layer materials are well known in the art.

The charge transport layer may comprise activating compounds or charge transport molecules dispersed in normally, electrically inactive film forming polymeric materials. These charge transport molecules may be added to polymeric materials which are incapable of supporting the injection of photogenerated holes and incapable of allowing the transport of these holes. An especially preferred charge transport layer employed in multilayer photoconductors comprises from about 25 percent to about 75 percent by weight of at least one charge transporting aromatic amine, and about 75 percent to about 25 percent by weight of a polymeric film forming resin in which the aromatic amine is soluble. Examples of typical charge transporting aromatic amines include triphenylmethane, bis(4-diethylamine-2- methylphenyl)phenylmethane; 4'-4"-bis(diethylamino)-2', 2"-dimethyltriphenylmethane-2-methylphenyl) phenylmethane; 4'-4"-bis(diethylamino) -2',2"-dimethyltriphenylmethane; N,N'-bis(alkylphenyl)-(1,1'-biphenyl)-4,4'-diamine wherein the alkyl is, for example, methyl, ethyl, propyl, n-butyl, etc.; N,N'-diphenyl-N,N'-bis (3"-methylphenyl)-(1,1'-biphenyl)-4,4'-diamine; and the like, dispersed in an inactive resin binder.

Any suitable inactive resin binder may be employed. Typical inactive resin binders include polycarbonate resins, polyvinylcarbazole, polyester, polyarylate, polyacrylate, polyether, polysulfone, and the like. Molecular weights can vary from about 20,000 to about 150,000.

The thickness of the charge transport layer may range from about 10 micrometers to about 50 micrometers, and preferably from about 20 micrometers to about 35 micrometers. Optimum thicknesses may range from about 23 micrometers to about 31 micrometers.

An optional conventional ground strip may be utilized along one edge of the electrophotographic imaging member. The ground strip may comprise a film forming polymer binder and electrically conductive particles. The ground strip may comprise materials such as those enumerated in U.S. Pat. No. 4,664,995. The ground strip layer may have a thickness from about 7 micrometers to about 42 micrometers, and preferably from about 14 micrometers to about 23 micrometers.

An optional conventional anti-curl layer may also be employed. The anti-curl layer may comprise organic polymers or inorganic polymers that are electrically insulating or slightly semi-conductive. The anti-curl layer provides flatness and/or abrasion resistance and may also contain microcrystalline silica or organic particulates to improve its frictional and wear properties. The anti-curl layer is formed at the back side of the substrate, opposite to the imaging layers. The thickness of the anti-curl layer is from about 3 micrometers to about 35 micrometers. An example of an anti-curl backing layer is described in U.S. Pat. No. 4,654,284 the entire disclosure of this patent being incorporated herein by reference.

An optional conventional overcoating layer may also be used. The optional overcoating layer may comprise organic polymers or inorganic polymers that are electrically insulating or slightly semi-conductive. The overcoating layer may range in thickness from about 2 micrometers to about 8 micrometers, and preferably from about 3 micrometers to about 6 micrometers.

For electrographic imaging members, a flexible dielectric layer overlying the conductive layer may be substituted for the photoconductive layers. Any suitable, conventional, flexible, electrically insulating dielectric polymer may be used in the dielectric layer of the electrographic imaging member. If desired, the concept of the morphologically improved seam configuration of this invention may be extended to flexible belts having different material compositions where cycling durability is important.

For intermediate image transport belts, the belt normally has an exposed outer surface layer containing an abhesive polymer that is flexible and stretchable. Typical abhesive polymers include tetrafluoroethylene, polysiloxane, fluorinated polyethylene, waxy polyethylene, waxy polypropylene, and the like such as disclosed in U.S. Pat. No. 4,196,256 and U.S. Pat. No. 5,049,444, the entire disclosures thereof being incorporated herein by reference.

Generally, electrostatographic imaging members are fabricated from webs by cutting the webs into rectangular sheets, overlapping a small segment of opposite ends of each sheet to form a loop and securing the overlapping ends of the sheet together and joined to form a narrow seam. The overlapping ends of the sheet may be secured to each other by any suitable technique such as ultrasonic welding, gluing, taping, pressure heat fusing, and the like. The preparation of welded belts is well known and disclosed, for example, in U.S. Pat. No. 4,532,166 and U.S. Pat. No. 4,838,964. The disclosure of these patents are incorporated herein in their entirety. As discussed hereinabove, the joining techniques, particularly the welding process, usually forms a flashing and a splashing of molten thermoplastic material from the coating layers of the welded belt that projects beyond the edges of the belt and situated at the ends of the seam as well as at the either side of the overlap. The flashing described for prior art belt photoreceptors is removed by means of a reciprocating punch which removes the flashing and part of the seam to form a notch in either side of the belt at the ends of the seam. The notch is shaped like a segment of a circle. It has, however, been demonstrated that the splashing present at both sides of the seam overlap of an electrostatographic imaging member belt can act as a focal point for concentrating stress to significantly reduce the service life of the seam due to development of cracking and delamination at the seam when the imaging member is subjected to bending tension and fatigue stress.

Moreover, an excessive seam overlap thickness and the splashing can interfere with the functions of a cleaning blade, exacerbate blade wear and tear, affect quality of movement of the imaging belt, and disturb other subsystems, such as image acoustic transfer device, during electrophotographic imaging belt processes. The thin seam profile of the belts of this invention minimizes the effects of repeated collisions with cleaning blades or acoustic image transfer assist devices. Also, the low seam profile avoids snagging of donor wires on donor rolls in certain development systems. Further, in comparisons of the seam of this invention with the seam of a commercial welded belt flexed over a 3 mm roller, the seam of the commercial welded belt delaminated after 8 flexes whereas no delamination was observed for the belt seam of this invention after 100 flexes.

Significant extension of the functional life of the seam as well as suppression of mechanical interactions between the belt and the cleaning blade and other contacting subsystems are achieved with the belt of this invention. When joined by ultrasonic welding to give a welded seam, the profile of the seam region produces little excess seam thickness compared to the thickness of the rest of the belt and very small splashing at the either side of the seam edges.

BRIEF DESCRIPTION OF THE DRAWINGS

A more complete understanding of the seam configuration of flexible electrophotographic imaging belts of the present invention can be achieved by reference to the accompanying drawings wherein.

The figures are merely schematic illustrations of the prior art and the present invention. They are not intended to indicate the relative size and dimensions of actual seamed electrophotographic imaging members.

DETAILED DESCRIPTION OF THE DRAWINGS

For reasons of convenience, the invention description will focus on the fabrication of flexible multiple layered electrophotographic imaging member belts using various morphologically improved seam configurations which have relatively thin seam and very small splashing. These invention seam configurations, however, are also applicable to other types of flexible belts such as intermediate image transfer belt, sheet transport belt, document handler belt, toner transporting donor belt, drive belt, conveyor belt, and the like.

Figure 1:
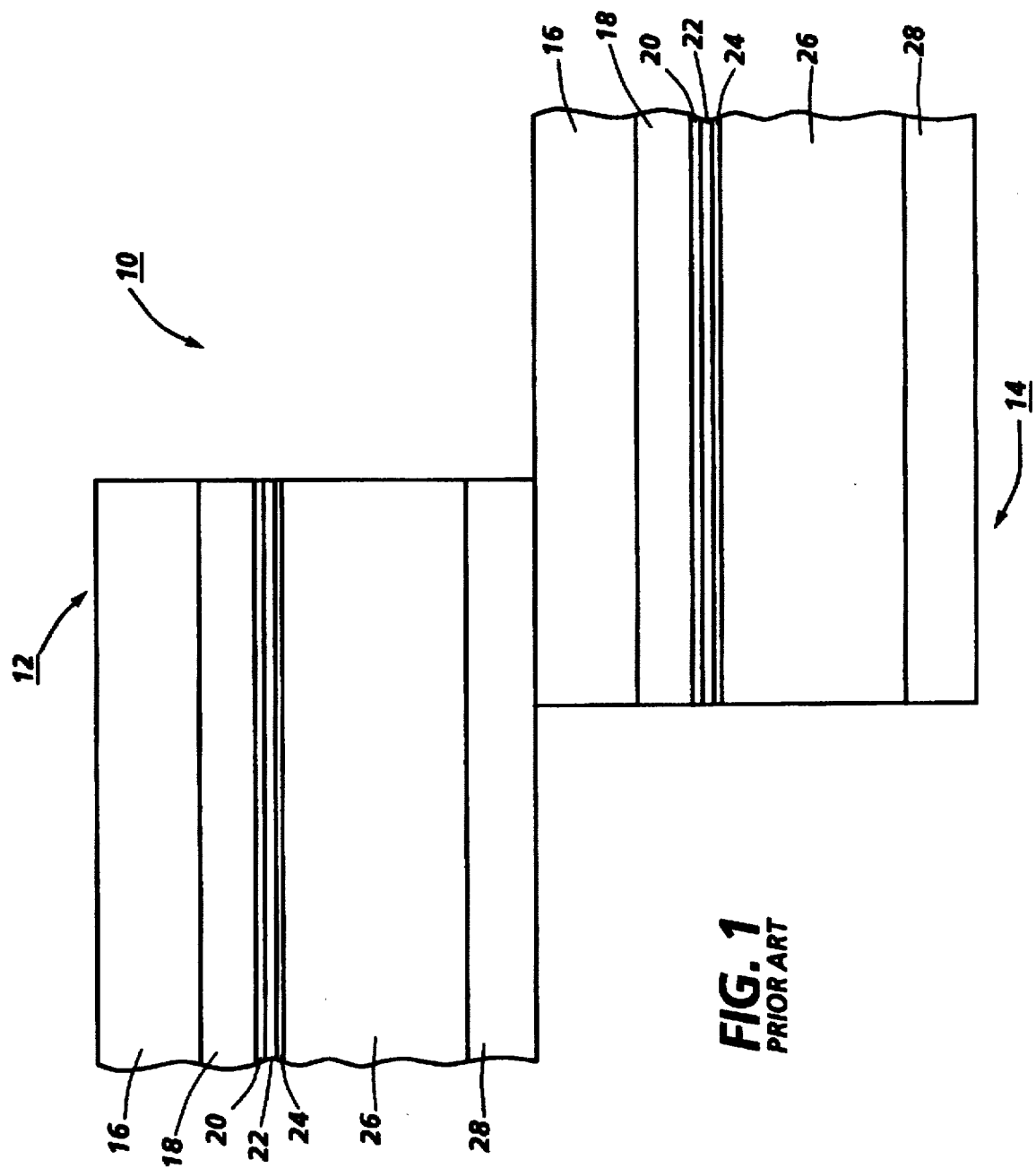
FIG. 1 is a cross sectional view of a flexible multiple layered electrophotographic imaging member secured by overlapping the opposite end regions.

Referring to FIG. 1, there is illustrated a flexible electrophotographic imaging member 10 in the form of a sheet having a first edge 12 overlapping a second edge 14 to form an overlap region, as described in a prior art. Satisfactory overlap width ranges from about 0.5 millimeter to about 1.7 millimeters. The flexible electrophotographic imaging member 10 can be utilized in an electrophotographic imaging apparatus and may be a single layer or multiple layer type photoreceptor. The layers of the flexible imaging member 10 can comprise numerous suitable materials having the required mechanical properties. These layers usually comprise charge transport layer 16, charge generating layer 18, adhesive layer 20, charge blocking layer 22, conductive layer 24, supporting substrate 26 and anti-curl backing layer 28. Examples of the types of layers and the properties thereof are described, for example, in U.S. Pat. No. 4,786,570, U.S. Pat. No. 4,937,117 and U.S. Pat. No. 5,021,309, the disclosures being incorporated herein by reference in their entirety. If the flexible imaging member 10 is to be constructed into a negatively charged photoreceptor device, the flexible imaging member 10 may comprise a charge generator layer sandwiched between a conductive surface and a charge transport layer.

Figure 2:
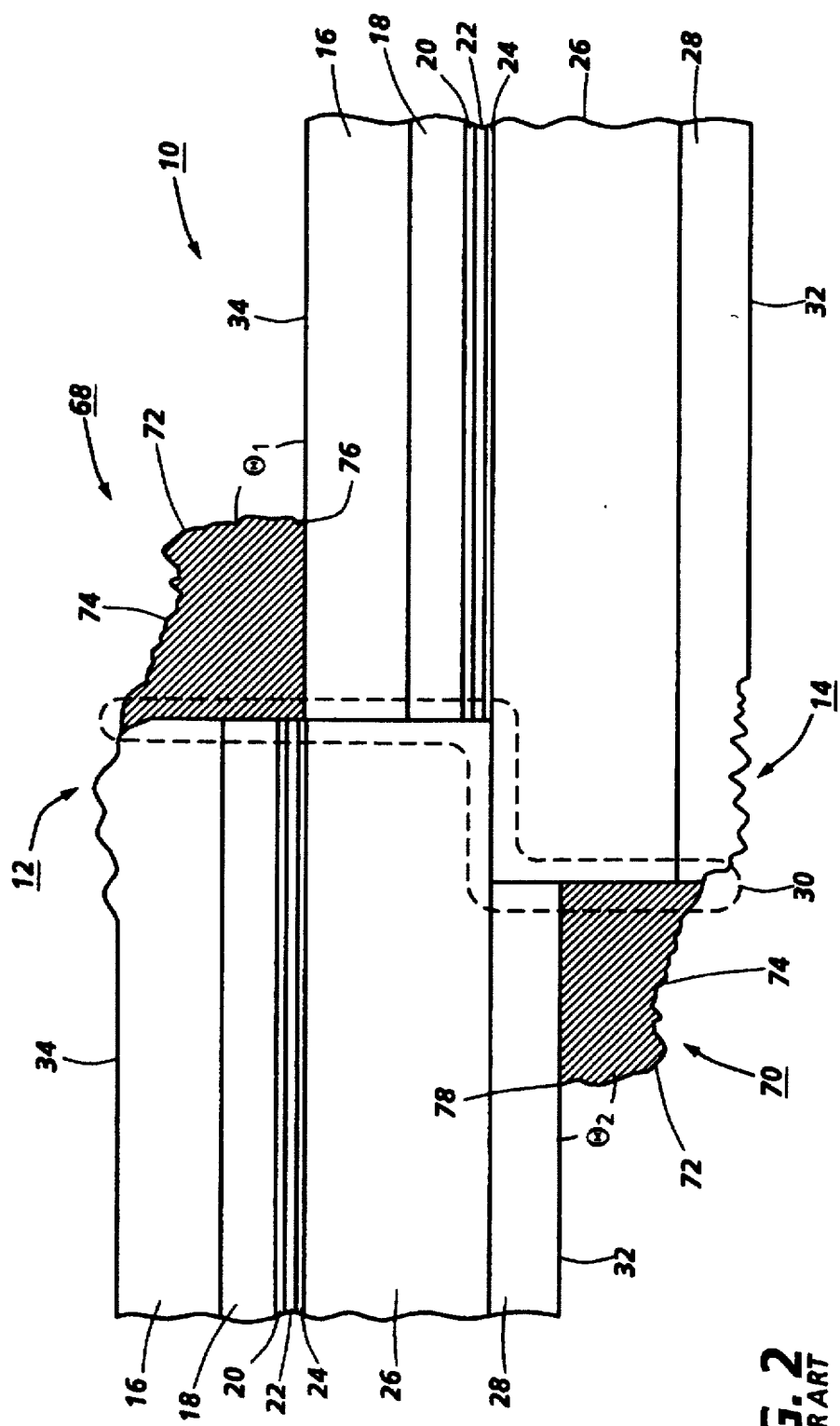
FIG. 2 is a cross sectional view of a flexible multiple layered seamed electrophotographic imaging belt of the prior art.

Edges 12 and 14 can be joined by any suitable means including, gluing, taping, stapling, pressure and heat fusing to form a continuous member, such as a belt, sleeve, or cylinder. Generally, an ultrasonic welding technique is used to bond edges 12 and 14 into a seam 30 in the overlap region as illustrated in FIG. 2. Flexible imaging member 10 is thus transformed from an electrophotographic imaging member sheet as illustrated in FIG. 1 to a continuous electrophotographic imaging seamed prior art belt as shown in FIG. 2. Flexible imaging member 10 has a first major exterior surface 32 and a second major exterior surface 34, opposed therefrom. Seam 30 (represented by dashed lines) joins the flexible imaging member 10 such that the second major exterior surface 34 (and generally including at least one layer thereabove) at and/or near the first edge 12 is integrally joined with the first major exterior surface 32 (and generally at least one layer therebelow) at and/or near second edge 14.

In the ultrasonic seam welding process, ultrasonic energy, applied to the overlap region, is used to melt the applicable layers of flexible imaging member 10 such as charge transport layer 16, charge generating layer 18, adhesive layer 20, charge blocking layer 22, conductive layer 24, a part of supporting substrate 26, and anti-curl backing layer.

Upon completion of the welding of the overlap region into a seam 30, the overlap region is transformed into an overlapping and abutting region as illustrated in FIG. 2. Within the overlapping and abutting region, the portions of the flexible imaging member 10, which once formed edges 12 and 14, are joined in seam 30 such that the formerly separated edges 12 and 14 now overlap and abut one another. Welded seam 30 contains upper and lower splashings 68 and 70, respectively, at each end thereof as illustrated in FIG. 2. Splashings 68 and 70 are formed during the process of joining edges 12 and 14 together. Molten material is necessarily ejected from the overlap region to facilitate direct fusing of support substrate 26 (of first edge 12) to support substrate 26 (of second edge 14). This results in the formation of splashings 68 and 70. Upper splashing 68 is formed and positioned above the overlapping second edge 14 abutting second major exterior surface 34 and adjacent and abutting overlapping first edge 12. Lower splashing 70 is formed and positioned below the overlapping first edge 12 abutting first major exterior surface 32 and adjacent and abutting the overlapping second edge 14. Splashings 68 and 70 extend beyond the sides and the ends of seam 30 in the overlap region of welded flexible member 10 to form flashings. The extension of the splashings 68 and 70 beyond the sides and the ends of seam 30 is undesirable for many machines, such as electrostatographic copiers and duplicators which require precise belt edge positioning of flexible imaging member 10 during machine operation. Generally, the extension of the splashings 68 and 70 (or flashings) extending beyond each end (not shown) of the seam usually are removed by a notching operation which cuts a slight notch into each end of the seam to remove the end splashings and a tiny portion of the seam itself.

A typical splashing has a thickness of about 68 micrometers. Each of the splashings 68 and 70 have an uneven but generally rectangular shape having a free side 72 extending inwardly from an exterior facing side 74 (extending generally parallel to either second major exterior surface 34 or first exterior major surface 32). Free side 72 of splashing 68 forms an approximately perpendicular angle $\theta_1$ with the first major exterior surface 32 of flexible imaging member 10. Similarly, free side 72 of splashing 70 forms an approximately perpendicular angle $\theta_2$ with the second major exterior surface 34 of the flexible imaging member 10. A junction site 76 is formed at the junction of side 72 of splashing 68 and the first major exterior surface 32 of the flexible imaging member 10. Likewise, a junction site 78 is formed at the junction of the free side 72 of the lower splashing 70 and the second exterior major surface 34 of the flexible imaging member 10. Both junction sites 76 and 78 provide focal points for stress concentration and become the initial sites of failure affecting the mechanical integrity of flexible imaging member 10.

During imaging machine operation, the flexible imaging member 10 cycles or bends over belt support rollers, not shown, particularly small diameter rollers, of an electrophotographic imaging apparatus. As a result of dynamic bending of flexible imaging member 10 during cycling, the small diameter rollers exert a bending strain on flexible imaging member 10 which causes large stress to develop generally around seam 30 due to the excessive thickness thereof.

The stress concentrations that are induced by bending near the junction sites 76 and 78 may reach values much larger than the average value of the stress over the entire belt length of flexible imaging member 10. The induced bending stress is inversely related to the diameter of the roller over which flexible imaging member 10 bends and directly related to the thickness of seam 30 of flexible imaging member 10. When flexible imaging member 10, contains an enlarged cross-sectional thickness at the overlap region, high localized stress occurs near the discontinuity, e.g. junction points 76 and 78.

When flexible imaging member 10 is bent over belt support rollers in an electrophotographic imaging apparatus (not shown), first major exterior surface 32 of flexible member 10, in contact the exterior surface of the roller, is under compression. In contrast, second major exterior surface 34 is stretched under tension. This is attributable to the fact that first major exterior surface 32 and second major exterior major surface 34 move through part of a circular path about a roller having a circular cross section. Since second major exterior surface 34 is located at a greater radial distance from the center of the roller than first exterior major surface 34, second major exterior surface 34 must travel a greater distance than first major exterior surface 32 in the same time period. Therefore, second major exterior surface 34 is stretched under tension relative to the generally central portion of the flexible imaging member 10 (the portion generally extending along the center of gravity of flexible imaging member 10). Conversely, first major exterior surface 32 is compressed relative to the generally central portion of flexible imaging member 10. Consequently, the bending stress at junction site 76 will be tension stress, and the bending stress at junction site 78 will be compression stress.

Figure 3:
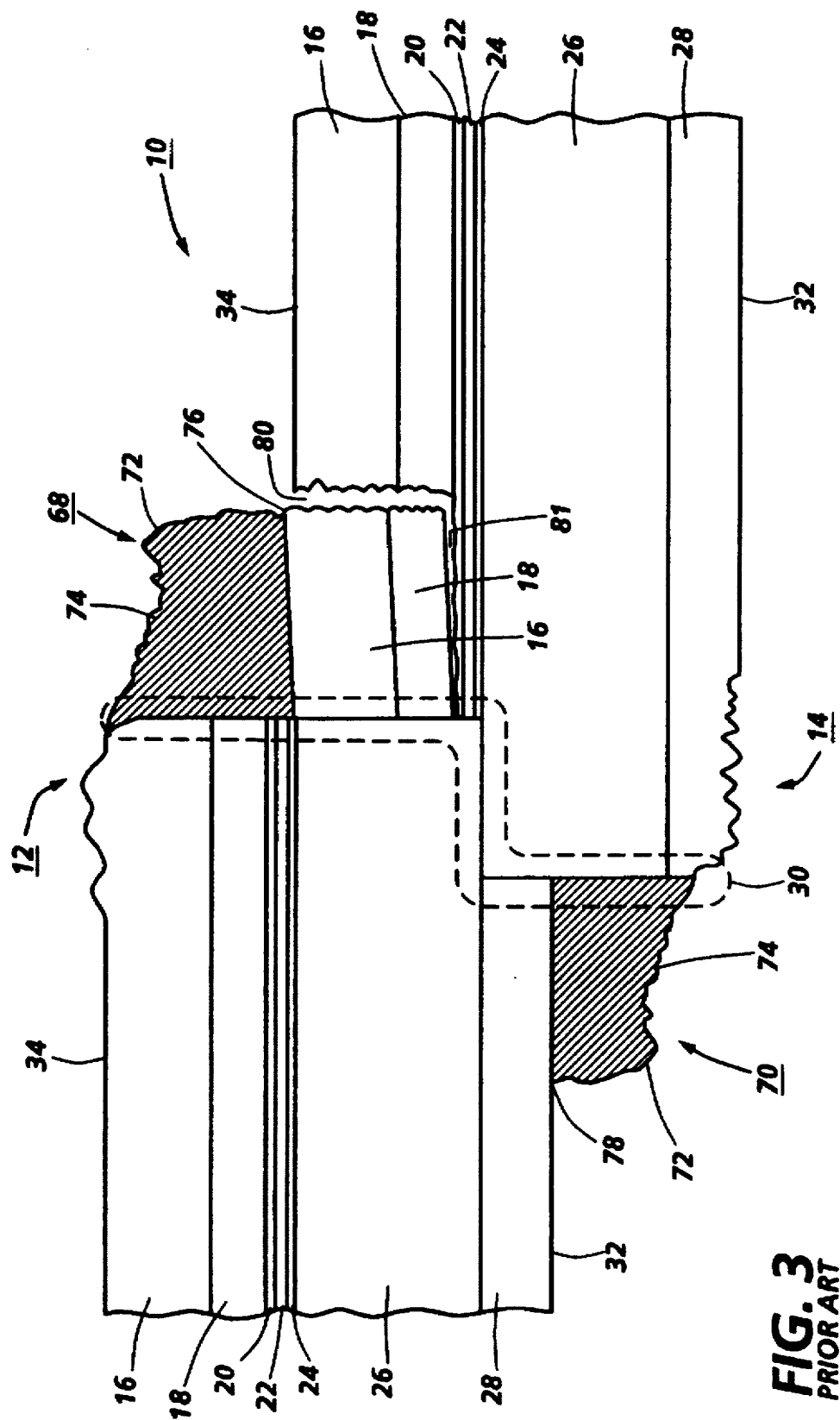
FIG. 3 is a cross sectional view of a flexible multiple layered seamed electrophotographic imaging belt of the prior art exhibiting seam that has cracked and delaminated after flexing over belt support rollers.

Compression stresses, such as at junction site 78, rarely cause seam 30 failure. Tension stresses, such as at junction site 76, however, are much more serious. The tension stress concentration at junction site 76 greatly increases the likelihood of tear initiation which will form a crack through the electrically active layers of flexible imaging member 10 as illustrated in FIG. 3. Tear 80, illustrated in FIG. 3, is adjacent second edge 14 of the flexible imaging member 10. The generally vertically extending tear 80 is initiated in charge transport layer 16 and propagates through charge generating layer 18. Inevitably, tear 80 extends generally horizontally leading to seam delamination 81 which propagates along the interface between the adjoining surfaces of the relatively weakly adhesively bonded charge generating layer 18 and adhesive layer 20. Because of its appearance, localized seam delamination 81 is typically referred to as "seam puffing". The excessive thickness of splashing 68 and stress concentration at junction site 76 tend to promote the development of dynamic fatigue failure of seam 30 and can lead to separation of the joined edges 12 and 14 and severing of flexible imaging member 10. This greatly shortens the service life of flexible imaging member 10.

In addition to causing seam failure, tear 80 acts as a depository site which collects toner particles, paper fibers, dirt, debris and other undesirable materials during electrophotographic imaging and cleaning. For example, during the cleaning process, a conventional cleaning instrument (not shown), such as a cleaning blade, will repeatedly pass over tear 80. As the site of tear 80 becomes filled with debris, the cleaning instrument dislodges at least a portion of highly concentrated debris from tear 80. The amount of the dislodged debris, however, is often beyond the capability of the cleaning instrument to remove from imaging member 10. As a consequence, the cleaning instrument will dislodge the highly concentrated level of debris, but will not be able to remove the entire amount during the cleaning process. Therefore, portions of the highly concentrated debris will be deposited onto the surface of flexible imaging member 10. In effect, the cleaning instrument spreads the debris across the surface of flexible imaging member 10 rather than effectively removing the debris therefrom.

Besides leading to seam failure and debris spreading, when local seam delamination 81 occurs, the portion of flexible imaging member 10 above seam delamination 81, in effect, becomes a flap which can move upwardly. The upward movement of the flap presents an additional problem in the cleaning operation because it is an obstacle in the path of the cleaning instrument as the instrument travels across the surface of flexible imaging member 10. The cleaning instrument eventually strikes the flap when the flap extends upwardly. As the cleaning instrument strikes the flap, great force is exerted on the cleaning instrument and can lead to blade damaging, e.g. excessive wear and tearing of a cleaning blade.

In addition to damaging the cleaning blade, collisions with the flap by the cleaning instrument causes unwanted velocity variations in flexible member 10 during cycling. This unwanted velocity variation adversely affects the copy/print quality produced by the flexible imaging member 10, particularly in high speed precision machines such as in color copiers where colored toner images must be sequentially deposited in precisely registered locations. More specifically, copy/print quality is affected because imaging takes place on one part of flexible imaging member 10 simultaneously with the cleaning of another part of flexible imaging member 10.

The velocity variation problems encountered with flexible imaging member 10 are not exclusively limited to flexible imaging member 10 undergoing seam delamination 81. The discontinuity in cross-sectional thickness of the flexible imaging member 10 at junction sites 76 and 78 also can create unwanted velocity variations, particularly when flexible imaging member 10 bends over small diameter rollers of a belt module or between two closely adjacent rollers. Moreover, splashing 70 underneath the seam collides with acoustic image transfer assist subsystems (not shown) during dynamic belt cycling, thereby causing additional unacceptable imaging belt velocity disturbances.

Figure 4:
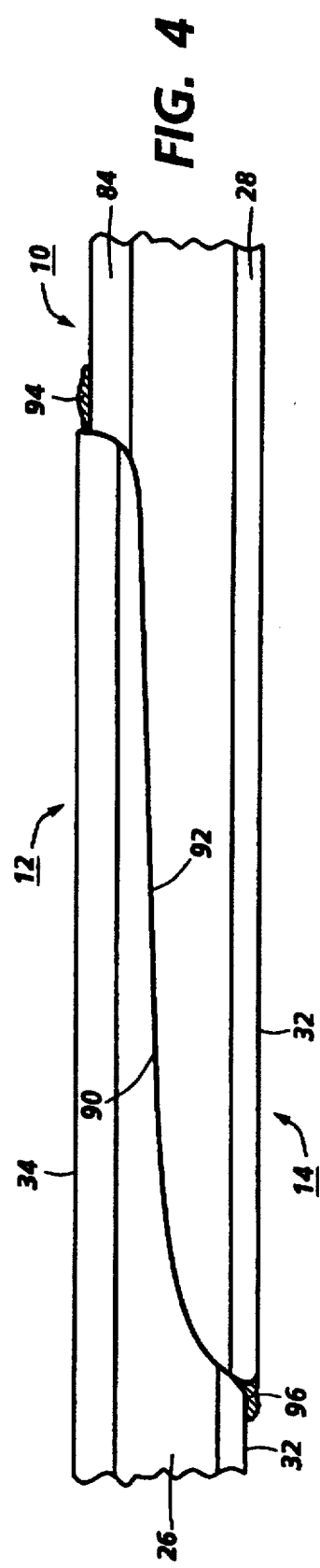
FIGS. 4 through 9 are cross sectional views of illustrative embodiments of flexible multiple layered electrophotographic imaging belts of the present invention.

Illustrated in FIG. 4 is a schematic depiction of flexible imaging member 10 having a supporting substrate 26 sandwiched between an anti-curl backing layer 28 and composite layer 84 which schematically depicts (for purposes of illustration simplification) a combination of charge transport layer 16, charge generating layer 18, adhesive layer 20, charge blocking layer 22, and conductive layer 24. In FIG. 4, flexible imaging member 10 is shown after material has been removed from first major exterior surface 32 adjacent and parallel to first edge 12 of flexible imaging member 10 to form a new first surface 90 having an elongated, curvilinear "S" shaped profile when viewed in a direction parallel to first edge 12. Also shown is flexible imaging member 10 after material has been removed from second major exterior surface 34 adjacent and parallel to second edge 14 to form a new second surface 92 having an elongated, curvilinear, reversed "S" shaped profile which substantially complements the profile of the first new surface. Other variations of the "S" shaped profile are illustrated in FIGS. 5 through 9 as described in detail hereinafter. After new first surface 90 and new second surface 92 are brought into contact with each other to form a mated surface region and ultrasonically welded together, they form an excellent overlapped joint having a thickness that only slightly exceeds the thickness of flexible imaging member 10 in regions that are not overlapped. Since this surface morphological alteration of overlapped opposite edges of a sheet allows direct contact of the support substrate at both ends of the original sheet regions for intimate fusion to each other during an ultrasonic seam welding process, little or no molten mixtures of imaging layer material 94 and 96 are ejected out to the either side of the seam overlap. Direct fusing of supporting substrate 26 at new first surface 90 to supporting substrate 26 at new second surface 92 provides enhanced seam strength, because of the greatly enlarge area of exposed supporting substrate 26 material that are mated, as well as better support substrate contact for improved ultrasonic fusing.

Figure 5:
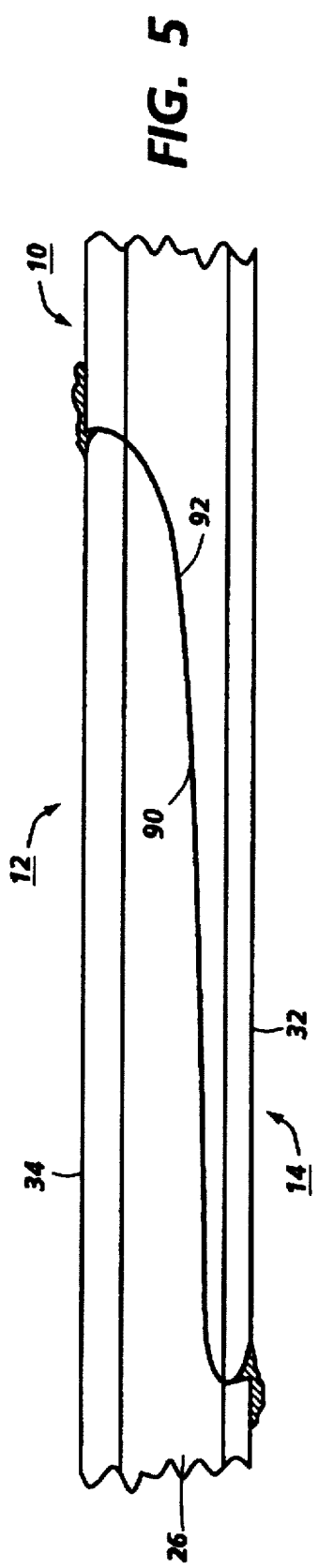

In FIG. 5, the surface profiles of new first surface 90 and new second surface 92 at the opposite edges 12 and 14 of the seamed flexible imaging member 10 have a reversed morphology compared to that illustrated in FIG. 4.

Figure 6:
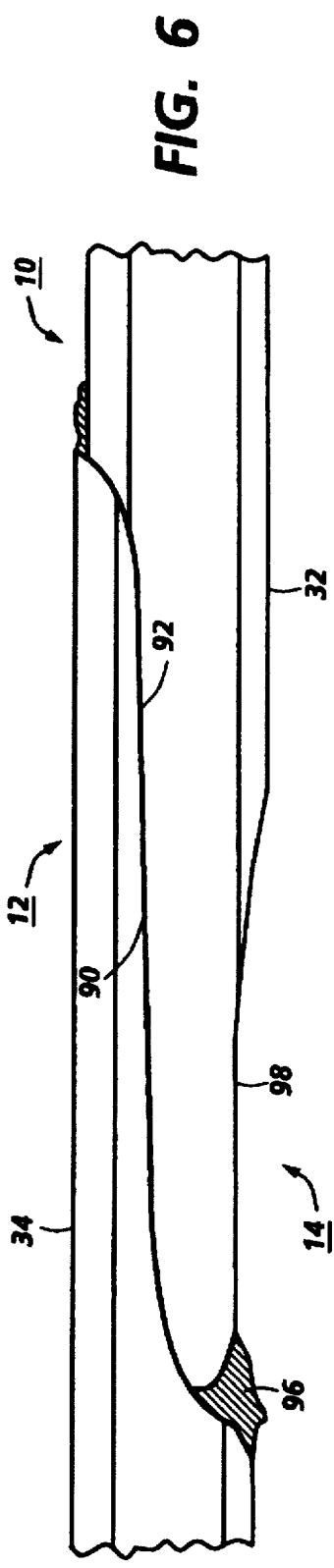

Referring to FIG. 6, the profile of new first surface 90 of first edge 12 is parabolic and similar to the shape shown in FIG. 4. However, a shallow depression 98 extending through first major exterior surface 32 and into part of support substrate 26 at second edge 14 is formed by beveling or scooping away material to reduce the thickness of the overlap seam. Since the top surface of second edge 14 was not altered prior to welding, more molten material 96 is ejected to the bottom side of the overlap during welding than if some material were removed prior to welding. The profile of new second surface 92 of second edge 14 as illustrated in FIG. 6 is an artifact of the ultrasonic seam welding process.

Figure 7:
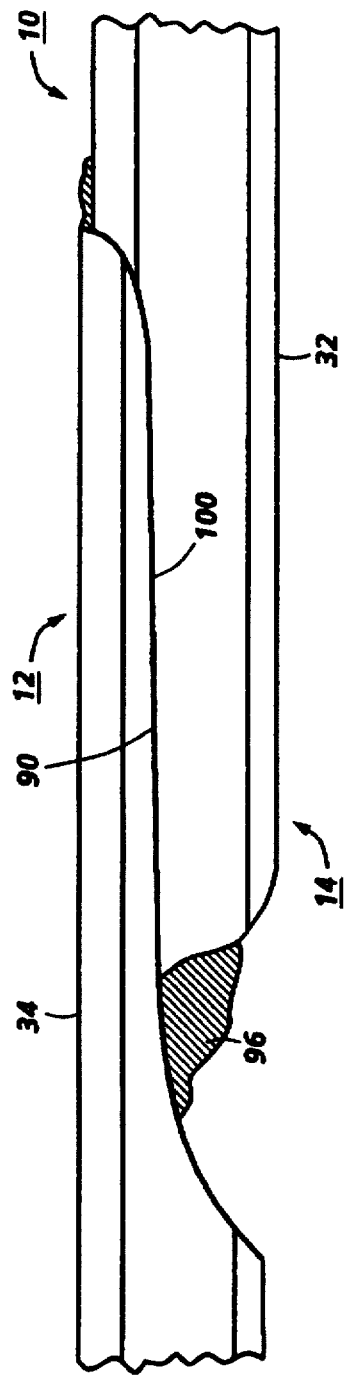

The morphological profiles of new first surface 90 and second surface 100 of flexible imaging member 10 presented in FIG. 7 has a configuration similar to that described in FIG. 6, except second exterior major surface 34 at second edge 14 is not beveled and second surface 100 of second edge 14 is shorter than new first surface 90 so that the shorter second surface 100 actually mates with and covers only about 70 percent of new first surface 90. This arrangement provides a more uniform seam thickness. However, since the top surface of second edge 14 was not altered prior to welding, a larger amount of molten material 96 is ejected during welding compared to that illustrated in FIG. 4. The original thickness of second surface 100 is also slightly compressed during the welding operation and undergoes a small thickness reduction of less than about 5 percent of its original thickness.

Figure 8:
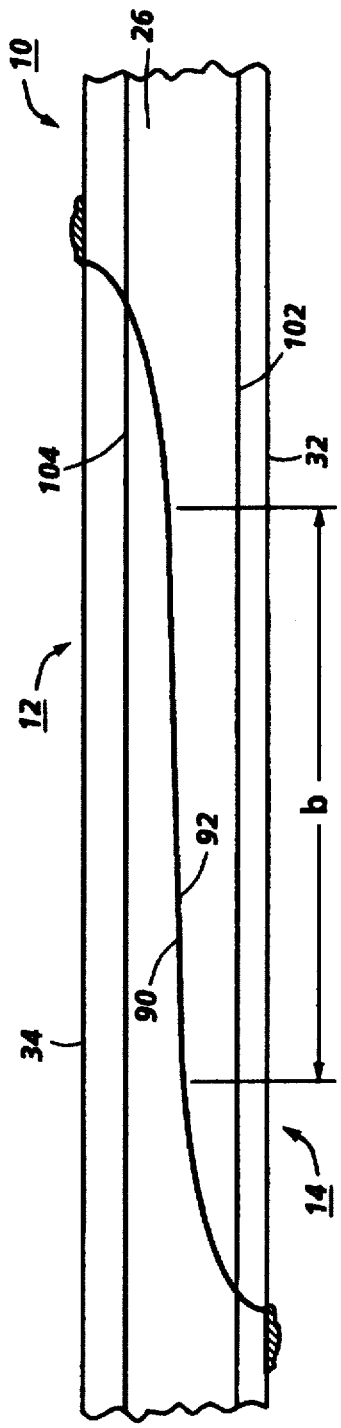

Referring to FIG. 8, the profiles of new first surface 90 and new second surface 92 of flexible imaging member 10 are shaped to provide a section "b" that is substantially parallel to and equidistant from first exterior major surface 32 and second exterior major surface 34. Also, section "b" is substantially parallel to and equidistant from the two major surfaces 102 and 104 of of supporting substrate 26 which ensures fusion of like substrate material during welding for stronger seams.

Figure 9:
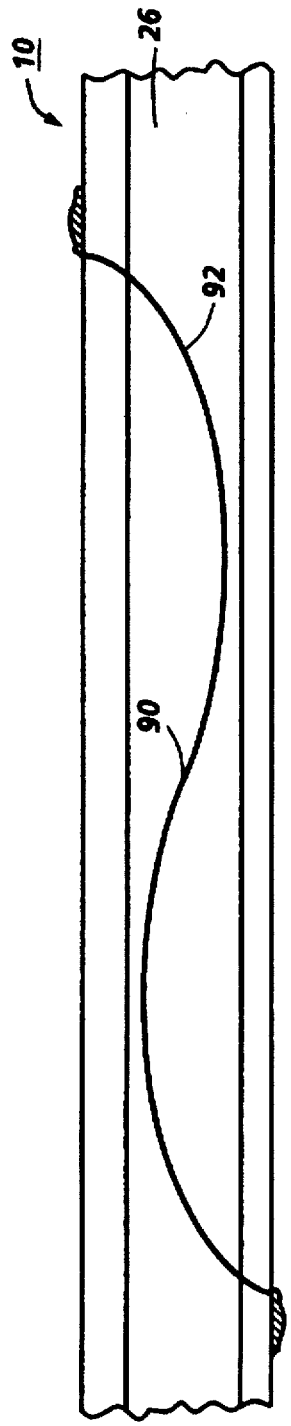

FIG. 9 shows a modified version of the embodiment illustrated in FIG. 8 in which, flexible imaging member 10 is provided with a sine wave shaped intersection between new first surface 90 and new second surface 92. This profile will provide greater mechanical interlocking at the overlap region and improve tensile rupture seam strength.

A satisfactory overlap width (i.e. mated surface region or contiguous contact width), measured in a direction perpendicular to the length of the mated surface region (i.e. measured in a direction transversely of the final belt), is between about 0.5 millimeter and about 1.7 millimeters. An overlap length of between about 0.7 millimeter and about 1.5 millimeters is particularly preferred. Optimum overlap improvement is achieved with an overlap width of between about 0.8 millimeter and about 1.25 millimeters. The overlap width should preferably be at least about 285 percent greater than the thickness of the belt. Further, to attain the improved results of this invention, the average thickness between new first surface 90 and the top of first edge 12 along an imaginary centerline measured in a direction perpendicular to second major exterior surface 34 in the region actually contacted with second edge 14 should be between about 30 percent and about 70 percent of the total thickness of imaging member 10 after a permanent seam has been formed (e.g. see FIGS. 4 and 5). For second edge 14, in embodiments having an unaltered top surface, the average thickness between new first surface 90 and second major exterior surface 34 at first edge 12 should be between about 30 percent and about 45 percent of the total thickness of imaging member 10 after a permanent seam has been formed to produce best results. The final welded belt preferably has a maximum seam centerline thickness less than about 120 percent of the thickness of the sheet prior to forming any seam to minimize the adverse effects of collisions between the seam or components thereof and various subsystems of electrostatographic imaging systems. Preferably, the minimum seam centerline thickness is more than about 80 percent of the thickness of the sheet prior to forming any seam to avoid any pronounced depression which could collect toner particles and other undesirable debris. At least about 75 percent of the mated surface region width, measured in a direction perpendicular to the mated surface region length should be substantially parallel to or have an average slope angle of less than about 2 degrees relative to either the first exterior major surface or second exterior major surface when the major surfaces are flattened to a planar configuration. This helps prevent separation of the first edge from the second edge during welding as observed when using an undesirable wedge-shaped (or diagonal) cut.

The surface profile of new first surface 90 and new second surface 92 of first edge 12 and second edge 14, respectively, of flexible imaging member 10 can be modified (by including altering the shape thereof and reducing the thickness thereof) by any suitable well known technique. Typical surface treatment methods include chemical treatment and mechanical treatment such as abrasion, grinding, slicing, laser ablation, or polishing.

Laser ablation refers to material being ejected by the sole interaction of a high intensity laser pulse with the material. Laser ablation is usually described in terms of a physical mechanism such as vaporization, ionization, or exfoliation. Ablation is most often performed in a vacuum or air. There are two kinds of laser ablation mechanisms: thermal and electronic (or non-thermal). If a thermal laser ablation process is used to change the profiles of new first surface 90 and new second surface 92, an intense laser pulse will be utilized to very rapidly heat and melt the surface of the securing means to alter the shape thereof.

If an electronic laser ablation mechanism is used, reliance on heating to change the profiles of new first surface 90 and new second surface 92 is unnecessary. Two electronic laser ablation processes are widely known. In the first, laser photons would be used to directly excite and break the bonds of the securing means to alter the shape thereof. In the second, photo-excitation creates electron-hole pairs. Once created, the potential energy of the electron-hole pair may be coupled directly into kinetic energy of the atoms of the splashing 68 via a radiation-free process. The energized atoms are able to overcome the surface binding energy to alter the shape and profile of the securing means. Electronic laser ablation is particularly preferred because (1) little or no thermal damage is observed in the area surrounding the ablated region, (2) large ablation depths per laser pulse are produced, and (3) spatial patterning and the ablated depth can be controlled precisely.

Another method for shaping the profiles of new first surface 90 and new second surface 92 is pulsed laser etching which has many of the same physical interaction mechanisms as laser ablation. Laser etching occurs in the following steps: 1) formation of reactive chemical species; 2) reaction of these species with the securing means to alter the shape thereof; and 3) removal of the excess waste from the surface of the flexible member 10. Laser etching is a chemically assisted laser removal process that results from laser irradiation in conjunction with an external gas or liquid (or even a solid) that chemically reacts with the material at the edges of imaging member 10. Laser etching, however, requires an active chemical medium to be in contact with new first surface 90 and new second surface 92 because the laser induced chemical reactions serve as the driving force for material removal. The input energy required to initiate these reactions is relatively small. Generally, laser ablation is preferred over laser etching because there is no need for a chemical medium. However, etching is preferred over ablation whenever it is desirable to minimize the thermal loading on new first surface 90 and new second surface 92. In addition, etching is also considered beneficial in preventing polymeric materials from distorting. Distortion affects the dimensional integrity of the flexible imaging member 10.

The profiles of new first surface 90 and new second surface 92 can also be achieved by a variety of mechanical devices such as an abrasive wheel or a smooth hot wheel having a heating element. A round wheel, mounted to any suitable support structure, can be rotatably driven by a suitable motor. If a hot wheel is to be used, a heating element is positioned within the wheel and is electrically connected to a suitable power source, such as a battery. The heating element heats the outer surface of the wheel as well as new first surface 90 and new second surface 92 when the wheel is contacted with new first surface 90 and new second surface 92. The temperature of the wheel is sufficiently elevated to soften and shape the profiles of new first surface 90 and new second surface 92.

The range of temperatures to which the new first surface 90 and new second surface 92 are heated depends on the thermal and rheological properties of the components of imaging member 10, e.g., the glass transition temperature, of the photosensitive layers used in the flexible member 10 are attained to permit shaping of the profile of first surface 90 and new second surface 92. When the photosensitive layers have reached their respective glass transition temperatures, the photosensitive layers are in a high viscosity state. The high viscosity state of the photosensitive layers readily permits re shaping or removal of material to shape the profiles of new first surface 90 and new second surface 92 by applied pressure. Typically, the temperature of the wheel ranges from between about 60° C. and about 220° C. if a heating element is utilized.

In addition to or alternative to the use of a heating element, the wheel may have an abrasive surface. The abrasive surface of the wheel, when adjusted for contact with the edges of imaging member 10, is utilized to rub or wear against new first surface 90 and new second surface 92 to alter the profiles thereof. Preferably, the abrasive surface comprises a multiplicity of either striations, coarse grit or grainy points for abrasive contact, each having a size approximately in the range of between about 5 and about 10 micrometers to achieve efficient polishing. If the shapes of the new first surface 90 and new second surface 92 are altered by abrasive grinding, the temperature of the wheel is preferably substantially lower then heat alone is used for shaping heating. Thus, a wheel temperature of 15° C. to 60° C., may be used for removal of material and shaping of opposite edges 12 and 14 prior to the overlapping and seaming process. This is because abrasive grinding is best performed when the ground material is cold.

Another mechanical device which may be utilized to shape the profiles of new first surface 90 and new second surface 92 is a skid plate which can be positioned to contact the edges of imaging member 10. The skid plate can comprise a heating element and/or an abrasive surface which functions in the manner described above with respect to the hot/abrasive wheel.

The overlapped edges may be joined by any suitable technique. Typical joining techniques include, for example, welding, gluing, taping, and the like and combinations thereof. Preferably, the overlapped edges are welded together by conventional ultrasonic welding techniques such as those described, for example, in U.S. Pat. No. 4,532,166, U.S. Pat. No. 4,838,964 and U.S. Pat. No. 4,937,117, the disclosures of these patents being incorporated herein by reference in their entirety.

It is evident that in accordance to the present invention, the techniques for fabricating a flexible imaging member belt from a rectangular sheet produces a seamed flexible imaging member belt free of excessively thick seams and large seam splashings in the seam area as is typically founded in other seamed flexible imaging members used in electrophotographic imaging systems. The improved belts of this invention extend the service life of the belt as well as enhancing subsystems performance. The flexible imaging member belts of this invention having the morphologically improved seam configurations of the present invention significantly suppress seam mechanical interaction with cleaning blades, belt support rollers and acoustic image transfer assist subsystems. They also reduce velocity variation of the cycling imaging belts and extend dynamic fatigue cracking/delamination resistance of the seam when passed over small diameter rollers.

This invention will further be illustrated in the following, non-limiting examples, it being understood that these examples are intended to be illustrative only and that the invention is not intended to be limited to the materials, conditions, process parameters and the like recited therein.

EXAMPLE I

A photoconductive imaging member web was prepared by providing a titanium coated polyester substrate having a thickness of 3 mils (76.2 micrometers) and applying thereto, using a gravure applicator, a solution containing 50 gms 3-aminopropyltriethoxysilane, 50.2 gms distilled water, 15 gms acetic acid, 684.8 gms of 200 proof denatured alcohol and 200 gms heptane. This layer was then allowed to dry for 5 minutes at 135° C. in a forced air oven. The resulting blocking layer had a dry thickness of 0.05 micrometer.

An adhesive interface layer was then prepared by applying with a gravure applicator to the blocking layer a wet coating containing 5 percent by weight based on the total weight of the solution of polyester adhesive in a 70:30 volume ratio mixture of tetrahydrofuran/cyclohexanone. The adhesive interface layer was allowed to dry for 5 minutes at 135° C. in the forced air oven. The resulting adhesive interface layer had a dry thickness of 0.07 micrometer.

The adhesive interface layer was thereafter coated with a charge generating layer containing 7.5 percent by volume trigonal Se, 25 percent by volume N,N'-diphenyl-N,N'-bis (3-methylphenyl)-1,1'-biphenyl-4,4'-diamine, and 67.5 percent by volume polyvinylcarbazole. This charge generating layer was prepared by introducing 8 gms polyvinyl carbazole and 140 ml of a 1:1 volume ratio of a mixture of tetrahydrofuran and toluene into a 20 oz. amber bottle. To this solution was added 8 gram of trigonal selenium and 1,000 gms of ⅛ inch (3.2 millimeter) diameter stainless steel shot. This mixture was then placed on a ball mill for 72 to 96 hours. Subsequently, 50 gms of the resulting slurry were added to a solution of 3.6 gm of polyvinyl carbazole and 20 gm of N,N'-diphenyl-N,N'-bis(3-methylphenyl)-1,1'-biphenyl -4,4'-diamine dissolved in 75 ml of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). This charge generating layer was dried at 135° C. for 5 minutes in the forced air oven to form a charge generating layer having a dry thickness of 2.0 micrometers.

This coated imaging member web was overcoated with a charge transport layer extrusion of the coating material. The charge transport layer was prepared by introducing into an amber glass bottle in a weight ratio of 1:1 N,N'-diphenyl-N,N'-bis(3-methylphenyl)-1,1'-biphenyl-4,4'-diamine and Makrolon R, a polycarbonate resin having a molecular weight of from about 50,000 to 100,000. The resulting mixture was dissolved in 15 percent by weight methylene chloride. This solution was applied on the charge generator layer by extrusion to form a coating which upon drying had a thickness of 24 micrometers.

The resulting photoreceptor device containing all of the above layers was dried at 135° C. in the forced air oven for 5 minutes.

An anti-curl back coating was prepared by combining 88.2 gms of polycarbonate resin, 0.9 gm of polyester resin and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear disperser to form the anti-curl back coating solution. The anti-curl back coating solution was then applied to the rear surface (side opposite the photogenerator layer and charge transport layer) of the photoconductive imaging member web by extrusion coating and dried at 135° C. for about 5 minutes in the forced air oven to produce a dried film having a thickness of 13.5 micrometers. The final dried photoconductive imaging member web had a total thickness of 130 micrometers.

EXAMPLE II

The photoconductive imaging member web of Example I was cut to provide eight 10.16 cm (4 in.)×10.16 cm (4 in.) imaging samples that were divided equally into four sets of two samples per set for fabrication into four morphologically different seam configurations and for their respective physical/mechanical evaluations.

In the first set of two samples, one end of each sample had a vertical cut end (cut in a direction perpendicular to the upper surface of the sample). The vertical cut end of one sample was overlapped a distance of about 1.25 millimeters over the cut end of the other sample in a manner similar to that illustrated in FIG. 1 and joined by conventional ultrasonic welding techniques using 20 KHz sonic energy supplied to a welding horn to form a seam similar to that illustrated FIG. 2. The welding horn had a flat bottom that was 1 millimeter wide and 13 millimeters long, the longer dimension being perpendicular to the length of the seam. This seam sample served as a control for comparison purposes.

EXAMPLE III

In a second set of two samples, one edge of one sample was skived to provide a 10° (acute angle between one exterior major surface and the planar new surface to be mated) newly formed wedge-shaped surface on one end. One edge of the second sample was also skived in the same manner as described for the first sample to compliment and conform to the newly formed wedge-shaped surface. More specifically, to compliment and conform with each other, the newly formed wedge-shaped surfaces on the two samples are parallel to each other immediately prior to joining. The width of each planar newly formed surface (the hypotenuse surface), measured along the surface in a direction perpendicular to the length of the newly formed surface was 748.7 micrometers (0.7487 millimeters). This was about 476 percent greater than the thickness of the belt. 100 percent of the mated surface region width, viewed in a direction parallel to the length of the overlap had a constant slope angle of about 10 degrees relative to either the first exterior major surface or second exterior major surface when the major surfaces are flattened to a planar configuration. With one sample right side up and the other upside down, the skived edges of the two samples were abutted and ultrasonically welded to each other in the same manner as described in Example II. The resulting welded seam was unsatisfactory because, under 20 KHz of applied sonic energy, the vertical pounding force imparted by the welding horn directly to the abutted wedge-shaped edges pushed the edges of the samples apart to reduce the size of the original area of contact or mating between each skived edge which in turn produced uneven defect spots along the entire length of the welded seam. Since this approach produced a defective welded seam, further physical/mechanical tests of the wedge-shape morphological seam configuration was abandoned.

EXAMPLE IV

In a third set of two samples, one edge of the first sample was shape-altered by using a high speed grinding wheel to form a profile similar to new first surface 90 illustrated in FIG. 4. One edge of the second sample was shape-altered by using a high speed grinding wheel to form a profile similar to new second surface 92 illustrated in FIG. 4. According to a cross-sectional view of a transmission electron micrograph of the welded seam, the average thickness between the new first surface and the adjacent exterior surface of the first sample measured in a direction perpendicular to the exterior sample surface in the region actually contacted with the new second surface was about 46 percent of the total thickness of the first sample and the average thickness between the new second surface and the adjacent exterior surface of the second sample measured in a direction perpendicular to the exterior sample surface in the region actually contacted with the first newly formed edge was about 62 percent of the total thickness of the second sample. The profiles of the new first surface and new second surface conformed with each other when joined. The mated surface region width, measured along the interface of the new first surface and new second surface in a direction perpendicular to the lengths of the new first surface and new second surface, was about 1.25 millimeters (1,250 micrometers). This was about 862 percent greater than the thickness of the belt. About 75 percent of the mated surface region width, measured along the interface of the new first surface and new second surface in a direction perpendicular to the lengths of the new first surface and new second surface had an average slope angle of less than about 2 degrees relative to either the first exterior major surface or second exterior major surface when the major surfaces are flattened to a planar configuration. When the mated new first surface and new second surface were ultrasonically welded to each other using the technique described in Example II, the vertical pounding force imparted by the welding horn directly to the overlapped new first surface and new second surface caused no visible change in the relative position of the edges of the samples that would have affected the size of the original area of contact or mating.

EXAMPLE V

In a fourth set of two samples, one edge of the first sample was shape-altered by using a high speed grinding wheel to form a profile similar to new first surface 90 illustrated in FIG. 7. None of the edges of the second sample were shape-altered. The average thickness between the new first surface and the adjacent exterior surface of the first sample measured in a direction perpendicular to the exterior sample surface in the region actually contacted with the surface of the second sample was about 40 percent of the total thickness of the first sample and the average thickness between the surface to be joined of the second sample measured in a direction perpendicular to the exterior sample surface in the region actually contacted with the first newly formed edge was 100 percent of the total thickness of the second sample because the edges of the second sample were not modified or altered. The new first surface of the first sample was positioned against the unaltered contacting surface of the second sample for joining. Although the new first surface has a surface width of 1.25 millimeters (1,250 micrometers) measured in a direction perpendicular to the length of the new first surface, the mated surface region width, measured along the interface of the new first surface and the contacting unmodified surface of the second sample in a direction perpendicular to the length of the interface, was only about 0.9 millimeter (900 micrometers). This was about 592 percent greater than the thickness of the belt. 95 percent of the mated surface region width, measured in a direction perpendicular to the length of the mated seam had an average slope angle of less than about 1.5 degrees relative to either the first exterior major surface or second exterior major surface when the major surfaces are flattened to a planar configuration. The mated new first surface and new second surface were ultrasonically welded to each other using the technique described in Example II. Since the contacting edge of the second sample was not modified, a shorter overlap width of about 0.9 millimeter was utilized to provide a more uniform thickness across the seam region. This embodiment requires fewer operational steps thereby doubling the speed and greatly decreasing the cost of belt fabrication.

EXAMPLE VI

The physical and mechanical properties of the photoconductive imaging members having various morphological seam designs of Examples II, IV, and V were evaluated to determine the seam area thickness, splashing dimension, surface quality, seam rupture strength, and dynamic fatigue seam failure. For seam area thickness measurement, a micrometer was used to measure the thickness of the seam as well as the thickness of the imaging member.

Since the surface quality of the seam and the splashing had a direct impact on cleaning efficiency and wear life of a cleaning blade, imaging belt velocity variation during cycling, and copy quality printout, these seam designs were analyzed using a surface analyzer (Surftest 402, available from Mitutoyo Corporation). Each seam sample of the above Examples were mounted and held down on the platform of the instrument. A stylus was let to travel and pass across the seam to characterize the seam. The surface profile of the seam according to the stylus travel was recorded with a chart recorder to give a surface characteristics profile of the seam overlap and adjacent splashings.

For seam strength determination, the following testing procedures were followed using an Instron Tensile Tester (Model TM, available from Instron Corporation):

(a) Cut a strip of test sample from each of the seam designs of the above Examples. Each test sample should have the dimensions of 1.27 cm×10.16 cm (0.5 in.×4 in.) with the seam situated at the middle and perpendicular to the long dimension of the test sample.

(b) Insert the test sample into the Instron jaws using a 5.08 cm (20 inch) gage length and seam positioning at the center between the jaws.

(c) Pull the seam sample at a cross-head speed of 5.08 cm/minute (2 in./minute), a chart speed at 5.08 cm/minute (2 in./minute), and a calibration of 50 pounds (22 kilograms) full scale to tensile seam rupture.

(d) Divide the load, in pounds, required to rupture the seam by 0.5 in. to obtain the seam rupture strength in lbs/in.

For seam dynamic fatigue endurance testing, a 2.54 cm.×20.22 cm (1 in.×8 in.) test sample having the seam situated at the middle and perpendicular to the length of the test sample was cut from each seam design of the above Examples. With a one pound weight attached at one end to provide a one lb./in. width tension, the test sample with the seam was 180° wrapped over a 0.12 in. (3.0 millimeter) diameter free rotating roller and the opposite end of the test sample was griped onto by hand. Under these conditions, the seam of the test sample was dynamically flexed back and forth over the roller by manually moving the hand up and down, at a rate of one flex per second, until seam cracking/delamination occurred. The results obtained from these tests are tabulated in Table I below. As shown in the table, implementation of the morphologically improved seam configurations of the present invention, the fabrication of photoconductive imaging member belts significantly reduces the seam thickness and the respective seam splashing dimensions. With the imaging member belts being subjected to only a constant 0.18 kg/cm (1 lb./in.) width belt tension under machine operating conditions, the observed seam rupture strength of 8.46 kgs/cm (47.3 lbs./in.) for Example V was slightly lower than the 8.79 kgs/cm (49.1 lbs./in.) for the prior art control seam counterpart of Example II. This slight reduction in seam rupture strength was due to the reduction of the overlap width at the seam and is considered insignificant as a practical matter.

More importantly, the dynamic fatigue life of the seam configurations of this invention was seen to outlast the conventional control seam when flexed over a small 3.0 millimeter diameter roller. The control seam was observed to develop seam cracking/delamination at only about 8 flexes, whereas the seam configurations of this invention showed no evidence of seam failure after 100 flexes of testing. Unlike the excessive seam thickness observed in the control seam, which was fabricated according to the procedures described in the prior art, the seam configurations of this invention had little added seam thickness compared to the thickness of the remaining portion of the imaging member. This reduction in thickness of seams of this invention decreased the bending stress over the roller, and therefore, increased the fatigue endurance of the seams.

TABLE I

| Example | Member Thickness (mms) | Seam Thickness (mms) | Splash Length (mms) | Seam Strength lbs./in.) | Seam Delamination (flexes) |
|---|---|---|---|---|---|
| II; Control | 130 | 206 | 1.00 | 49.1 | 8 |
| IV; Invention | 130 | 139 | 0.16 | 49.7 | >100 |
| V; Invention | 130 | 147 | 0.21 | 47.3 | >100 |

EXAMPLE VII

The photoconductive imaging web of Example I was cut to provide two imaging member sheets having dimensions of 41.4 cm (16.3 in.)×114.5 cm (45.1 in.). The opposite ends of the first imaging member sheet was ultrasonically joined into an imaging member belt to form a welded seam using the conventional prior art seaming technique of Example II, whereas the second imaging member sheet was ultrasonically welded into an imaging member belt by following the fabrication method of Example V to form a belt having the morphologically improved seam configuration of this invention. Both imaging member belts were subsequently evaluated for velocity variations when cycled against a cleaning blade, an image acoustic transfer assist device, and the belt support rollers of a Xerox 5775 xerographic copier machine operating at a belt cycling speed of 19.1 cm (7.5 inches) per second.

The cyclic test data obtained showed that the control imaging belt having the prior art seam exhibited a 4.2 percent average belt speed disturbance due to mechanical interaction against the cleaning blade, image acoustic transfer assist device and belt support roller subsystems. In sharp contrast, the imaging belt with the seam fabricated in accordance with the invention developed only a small average velocity variation of 1.5 percent. Compared to a background average belt speed variance of 1.3 percent, it became apparent that the velocity variations in an imaging belt could reasonably be maintained by utilizing belts having the morphologically improved seams of the present invention.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for fabricating a seamed electrostatographic imaging belt comprising providing a flexible substantially rectangular electrostatographic imaging sheet having a first major exterior surface opposite and parallel to a second major exterior surface, shaping said first major exterior surface adjacent and parallel to a first edge of said sheet to form a new first surface having an elongated, curvilinear "S" shaped profile when viewed in a direction parallel to said first edge, overlapping said new first surface and a second surface adjacent to a second edge of said sheet after said shaping whereby said first new surface contacts said second surface to form a mated surface region, said second surface being adjacent to or part of said second major exterior surface to form said sheet into a loop, said second edge being at an end of said sheet opposite from said first edge, and permanently joining said new first surface to said second surface into a seam to form a seamed electrostatographic imaging belt, said seam having an imaginary centerline along the length of said seam transversely of said belt, and said seam having an average thickness of between about 80 percent and about 120 percent of the total thickness of said sheet.

2. A process according to claim 1 including shaping said second major exterior surface adjacent and parallel to said second edge of said sheet to form said second surface prior to said overlapping, said second surface having an elongated, curvilinear, reversed "S" shaped profile when viewed in a direction parallel to said second edge.

3. A process according to claim 1 wherein said mated surface region has a width, measured in a direction perpendicular to the length of said mated surface, between about 0.5 millimeter and about 1.7 millimeters.

4. A process according to claim 3 wherein at least about 75 percent of said width of said mated surface region is substantially parallel to or has an average slope angle of less than about 2 degrees relative to either said first exterior major surface or said second exterior major surface when said major surfaces are flattened to a planar configuration.

5. A process according to claim 1 wherein said mated surface region has a width, measured in a direction perpendicular to the length of said mated surface, between about 0.7 millimeter and about 1.5 millimeters.

6. A process according to claim 1 wherein said mated surface region has a width, measured in a direction perpendicular to the length of said mated surface, between about 0.8 millimeter and about 1.25 millimeters.

7. A process according to claim 1 wherein said mated surface region has a width, measured in a direction perpendicular to the length of said mated surface region, is at least about 285 percent greater than the thickness of said sheet.

8. A process according to claim 1 including permanently joining said new first surface to said second surface into a seam by ultrasonic welding.

9. A process according to claim 1 wherein said electrostatographic imaging belt comprises an electrographic imaging belt.

10. A process according to claim 1 wherein said electrostatographic imaging belt comprises an electrophotographic imaging member.

11. A process according to claim 10 wherein said electrophotographic imaging belt comprises a supporting substrate layer, a charge generation layer and a charge transport layer.

12. A process according to claim 1 wherein said shaping of said first major exterior surface comprises removing material from said first major exterior surface to form said new first surface having said elongated, curvilinear "S" shaped profile prior to said overlapping.

13. A process according to claim 12 wherein said shaping of said first major exterior surface comprises removal of said material from said first major exterior surface by abrasion to form said new first surface having said elongated, curvilinear "S" shaped profile prior to said overlapping.

* * * * *